United States Patent
Liang et al.

(10) Patent No.: US 12,223,420 B2
(45) Date of Patent: Feb. 11, 2025

(54) ARTIFICIAL LEARNING FRACTURE SYSTEM AND METHOD FOR PREDICTING PERMEABILITY OF HYDROCARBON RESERVOIRS

(71) Applicant: Chevron U.S.A. Inc., San Ramon, CA (US)

(72) Inventors: Baosheng Liang, Houston, TX (US); Chaoshun Hu, Houston, TX (US); Min Li, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 574 days.

(21) Appl. No.: 17/039,403

(22) Filed: Sep. 30, 2020

(65) Prior Publication Data
US 2021/0097390 A1    Apr. 1, 2021

Related U.S. Application Data

(60) Provisional application No. 62/909,029, filed on Oct. 1, 2019.

(51) Int. Cl.
*G06N 3/08*      (2023.01)
*G01V 20/00*    (2024.01)
(Continued)

(52) U.S. Cl.
CPC ............... *G06N 3/08* (2013.01); *G01V 20/00* (2024.01); *G06N 3/04* (2013.01); *G06N 3/045* (2023.01); *E21B 2200/22* (2020.05); *G01V 2210/6246* (2013.01); *G06Q 10/04* (2013.01); *G06Q 50/02* (2013.01)

(58) Field of Classification Search
CPC ........... G06N 3/04; G06N 3/042; G06N 3/08; G06N 3/088; G06N 3/0895; G06N 3/09; G06N 20/00; G06N 20/10; G06N 20/20; G06N 3/045; G01V 99/005; G01V 2210/00; G01V 2210/1234; G01V 2210/6246; E21B 2200/22; G06Q 10/04; G06Q 40/02; G06Q 50/02
See application file for complete search history.

(56) References Cited

U.S. PATENT DOCUMENTS

2010/0211536 A1    8/2010  Al-Fattah
2019/0064389 A1*  2/2019  Denli ................... G01V 99/005
(Continued)

FOREIGN PATENT DOCUMENTS

WO    2018140596 W    8/2018

OTHER PUBLICATIONS

Lecun, Y., et al., "Deep Learning", Nature, May 28, 2015, pp. 436-444, vol. 521, Macmillan Publishers Limited.
(Continued)

*Primary Examiner* — Shane D Woolwine
(74) *Attorney, Agent, or Firm* — Marie L. Clapp

(57) ABSTRACT

A method is described for predicting permeability including receiving a 3-D earth model including a volume of interest; generating 2-D property images; receiving 2-D fracture images; training a physics-guided neural network using the 2-D fracture images; and predicting permeability using the physics-guided neural network applied to the 2-D property images. The method is executed by a computer system.

7 Claims, 11 Drawing Sheets

(51) Int. Cl.
*G01V 99/00* (2009.01)
*G06N 3/04* (2023.01)
*G06N 3/045* (2023.01)
*G06Q 10/04* (2023.01)
*G06Q 50/02* (2024.01)

(56) References Cited

U.S. PATENT DOCUMENTS

| | | | |
|---|---|---|---|
| 2019/0249534 A1 | 8/2019 | Hoeink | |
| 2019/0257977 A1 | 8/2019 | Skalinski | |
| 2020/0183031 A1* | 6/2020 | Denli | G01V 1/301 |
| 2020/0279361 A1* | 9/2020 | Koushavand | E21B 43/00 |

OTHER PUBLICATIONS

Karpatne, A., et al., "Physics-Guided Neural Networks (PGNN): An Application in Lake Temperature Modeling," Retrieved on Feb. 20, 2018 from https://arxiv.org/abs/1710.11431.

Sudakov, O., et al., "Driving Digital Rock Towards Machine Learning: Predicting Permeability with Gradient Boosting and Deep Neural Networks," Preprint submitted to Journal of Latex Templates; Mar. 16, 2018, Retrieved on Mar. 14, 2018 from https://arxiv.org/pdf/1803.00758.pdf.

Wu, J. L., et al., "Seeing Permeability From Images: Fast Prediction with Convolutional Neural Networks," Preprint Submitted to Science Bulletin, Sep. 11, 2018, Retrieved on Sep. 9, 2018 from https://arxiv.org/pdf/1809.02996.pdf.

Lecun, Y., et al. "Convolutional networks and applications in vision." Proceedings of 2010 IEEE International Symposium on Circuits and Systems (2010), pp. 253-256.

Fruhwirth, R.K., et al., "Hybrid Simulation Using Neural Networks to Predict Drilling Hydraulics in Real Time," SPE-103217-MS, 2006, Society of Petroleum Engineers.

Shokir E. M., "A Novel Model for Permeability Prediction in Uncored Wells," SPE-87038-PA, pp. 266-273, Jun. 2006, SPE Reservoir Evaluation & Engineering.

Nattavadee Srisutthiyakorn et al., (2016), "Deep-learning methods for predicting permeability from 2D/3D binary-segmented images," SEG Technical Program Expanded Abstracts, 2016, pp. 3042-3046, Society of Exploration Geophysicists.

PCT International Search Report mailed on Jan. 14, 2021 issued in Application No. PCT/IB20/059136, filed on Sep. 30, 20, 4 pages.

Siyan Liu et al., "Fast estimation of permeability in sandstones by 3D convolutional neural networks," SEG Technical Program Expanded Abstracts, 2019, pp. 4833-4838, Society of Exploration Geophysicists.

* cited by examiner

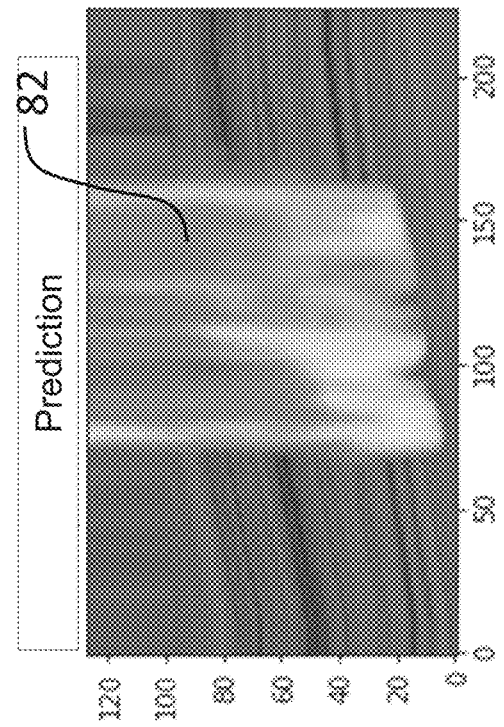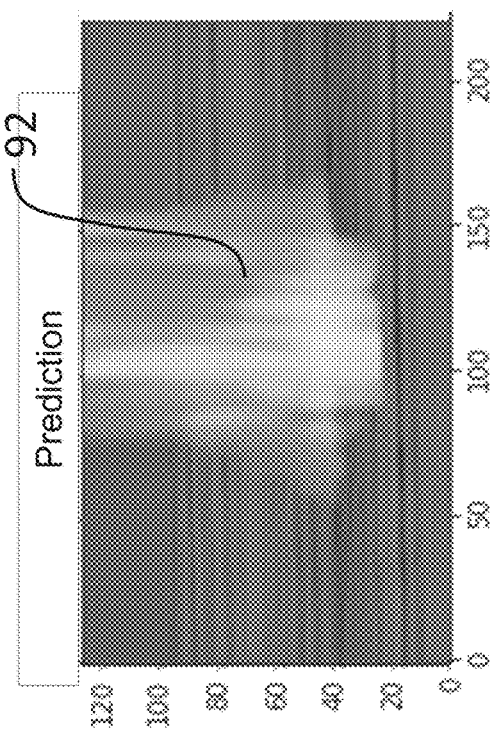

ARTIFICIAL LEARNING FRACTURE SYSTEM AND METHOD FOR PREDICTING PERMEABILITY OF HYDROCARBON RESERVOIRS

CROSS-REFERENCE TO RELATED APPLICATIONS

This application claims priority benefit to U.S. Provisional Patent Application 62/909,029 filed on Oct. 1, 2019.

STATEMENT REGARDING FEDERALLY SPONSORED RESEARCH OR DEVELOPMENT

Not applicable.

TECHNICAL FIELD

The disclosed embodiments relate generally to techniques for predicting permeability in subsurface reservoirs and, in particular, to a method of predicting permeability in low-porosity reservoirs after hydraulic fracturing.

BACKGROUND

Capturing the detailed hydraulic fracture shape and the associated permeability enhanced by hydraulic fracturing in low-porosity hydrocarbon reservoirs is a key to horizontal well performance prediction and landing. At present, such work is first simulated through hydraulic fracture modeling software for each completion stage in the 3D earth model and then converted to fracture permeability in reservoir model for reservoir simulation. This process is extremely time-consuming and therefore can only be used to constrain the evaluation on well performance and landing for very few scenarios.

Permeability prediction directly from images enabled by neural networks is a novel method and has a great potential. However, in those investigations, either 1D multivariate analysis was applied to well logging data and neural network or a single channel or type multidimensional image data was used as input and the classic classifier output was extended from discrete value to continuous value. Models behind those investigations often simplify the problem by multivariate linear regression, either without considering spatial pattern or only considering the traditional single image variable's pattern distribution with the ignorance of the contribution or interaction from other physical variables. As shown in FIG. 1, the conventional numerical simulation methods are time consuming and tedious making it impossible to simulate a variety of wells and the updates to the permeability models are slow.

There exists a need for improved permeability prediction in order to optimize production from low-porosity hydrocarbon reservoirs.

SUMMARY

In accordance with some embodiments, a method for predicting permeability including receiving a 3-D earth model including a volume of interest; generating 2-D property images; receiving 2-D fracture images; training a physics-guided neural network using the 2-D fracture images; and predicting permeability using the physics-guided neural network applied to the 2-D property images is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
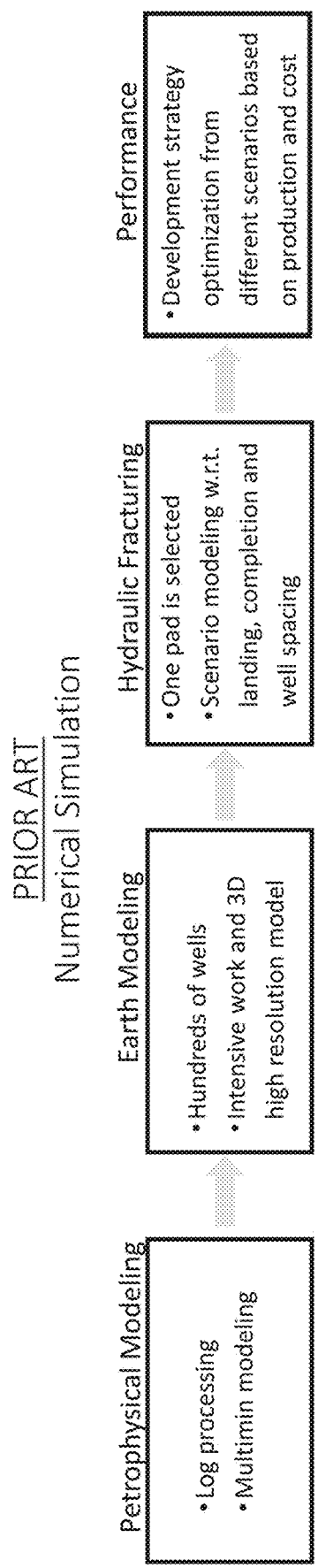
FIG. 1 demonstrates a conventional method for permeability prediction and its shortcomings.

Described below are methods, systems, and computer readable storage media that provide a manner of permeability prediction. These embodiments are designed to be of particular use for permeability prediction in low-porosity reservoirs. These embodiments take advantage of the integration of geospatial distribution and deep learning Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Computing multi-scale transport properties, especially reservoir parameters such as permeability field in the subsurface, is critical in low-porosity reservoir characterization. Such computation is generally performed in two steps, i.e., classic porosity-permeability transform for matrix permeability and then numerical simulation of hydraulic fracture to generate post-fracture permeability.

In the first step, porosity-permeability transform can be generated from core measurements. Alternatively, the discrete geometry network is used to abstract the subsurface media, then a simplified flow equation or classic empirical formula can be used to reduce the cost to predict the permeability, for example, the Kozeny-Carman equation is often utilized to fit the porosity-permeability relation to get the estimate:

$$k = \frac{0.14\phi^3}{s^2(1-\phi)^2} \quad (1)$$

where $\emptyset$ is porosity and s is the ratio of different geometry parameters from Voronoi cell when the pore space is described using the Delaunay triangular grid partitioned from Voronoi tessellation method.

In the second step, the detailed hydraulic fracture shape and the associated permeability enhanced by hydraulic fracture in the low-porosity reservoir are directly simulated through hydraulic fracture modeling software for every completion stage in the 3D earth model and then converted to post-fracture permeability in reservoir model for reservoir simulation. This extremely time-consuming process constrains well performance diagnostics and optimization of well spacing, completions and landing into a few numbers of scenarios.

The present invention focuses on the second step using supervised machine-learning to improve efficiency and results, allowing the method to be used for many scenarios. Given that post-fracture permeability field is a joint function of reservoir model and geomechanical model, it is possible to predict them using multi-channel whole-image half CNN approach, which can help develop a surrogate model that directly maps the subsurface input model slices into continuous high-resolution permeability images.

The present invention uses multi-channel whole-image half conventional neural network (CNN) for regression tasks, by replacing the full connection layer with whole-image permeability image and training the network with continuous feature maps. An embodiment may also add deconvolution layers to formulate a physical-informed deep learning neural network which has better results than regular half CNN and significantly improves prediction resolution. To enhance the efficiency of our innovative deep learning, it may be implemented using multiple general processing units (GPUs).

Recently a framework called physics-guided neural network (PGNN) has been proposed to leverage the output of physics-based model simulations along with observation features to generate predictions using a dense neural network architecture. Two strategies have been suggested to use in PGNN. The first one is a "generalized transfer learning" concept where a predefine physical model plus other features are used as the input to build a neural network to match the target; the second strategy is to include physical constraints in the loss function.

However, physics-guided neural network is based on the effectiveness of the conventional physics simulation theory and the constraints. If the conventional physical theory is unclear or ineffective, the bias introduced by physical theory and constraints will cause misleading conclusion. Therefore, the application of this type PGNN is limited.

The present invention is a new way to do physics-guided neural network for the subsurface reservoir characterization problem. Firstly, our data set has been prepared through an integrated physical modeling workflow with earth modeling, hydraulic fracturing, performance prediction and uncertainty assessment and further validated through field production and surveillance in different areas and formations. Secondly, the network architecture for deep learning is customized to deal with different scales in fractured- and non-fractured zones. It is not limited to a 1D or 2D dense network but can use different 2D or 3D convolutional neural networks, for example, UNet or Autoencoder models with residual like blocks or inception like blocks. Thirdly, we innovated data ingestion by creating a super image set with multiple channels where each channel contains the specific 2D or 3D reservoir and rock properties and loading in batches for training and prediction. Fourthly, the method discretizes input and output properties and also considers transformations to change variables from linear to logarithm or exponential on the basis of physics. Finally, the method adds an extra loss function term for structural constraints to distinguish fractured and non-fractured zones where non-fractured zones retain as same as the original background and fracture zones are satisfied with local smoothing and considered by physical pattern continuities.

In an embodiment for training the present invention, a deep deconvolution neural network that performs pixel-wise image regression is used to predict subsurface reservoir image update using multiple image feature regression. The deconvolution net may be, by way of example and not limitation, composed of 13 hidden layers using convolution, max pooling, upsampling, batch normalization and deconvolution units. The first half part is similar to a VGG model and has a very flexible architecture that can be altered and trained for any dimension size and resolution of multiple different feature images. The second part up-samples and increase the low-resolution by max pooling back to original resolution. The proposed model may be trained, for example, using 1000 more cases from different hydraulic fracturing steps. In an embodiment, it may use distributed computation on a GPU cluster for higher performance.

In an embodiment, the method uses a physical-informed machine learning framework to combine different input image information like matrix permeability, porosity, water saturation, Young's modulus, minimum horizontal stress, reservoir pressure and clay content as the different image channels in the same neural network. To achieve output resolution same with the input, a deep deconvolution neural network that performs pixel-wise image regression is developed to predict subsurface reservoir image update. The deconvolution net is composed of more than 10 hidden layers, using convolution, max pooling, up-sampling, batch normalization and deconvolution units. It has a very flexible architecture that can be altered and trained for any dimension size and resolution of multiple different feature images. In one example, the method produced excellent results ($R^2>0.9$) by using 25 training cases and 4 HPC GPUs with 50-minute run time. In contrast, it took nearly 4 months to generate them using the traditional approach.

Figure 2:
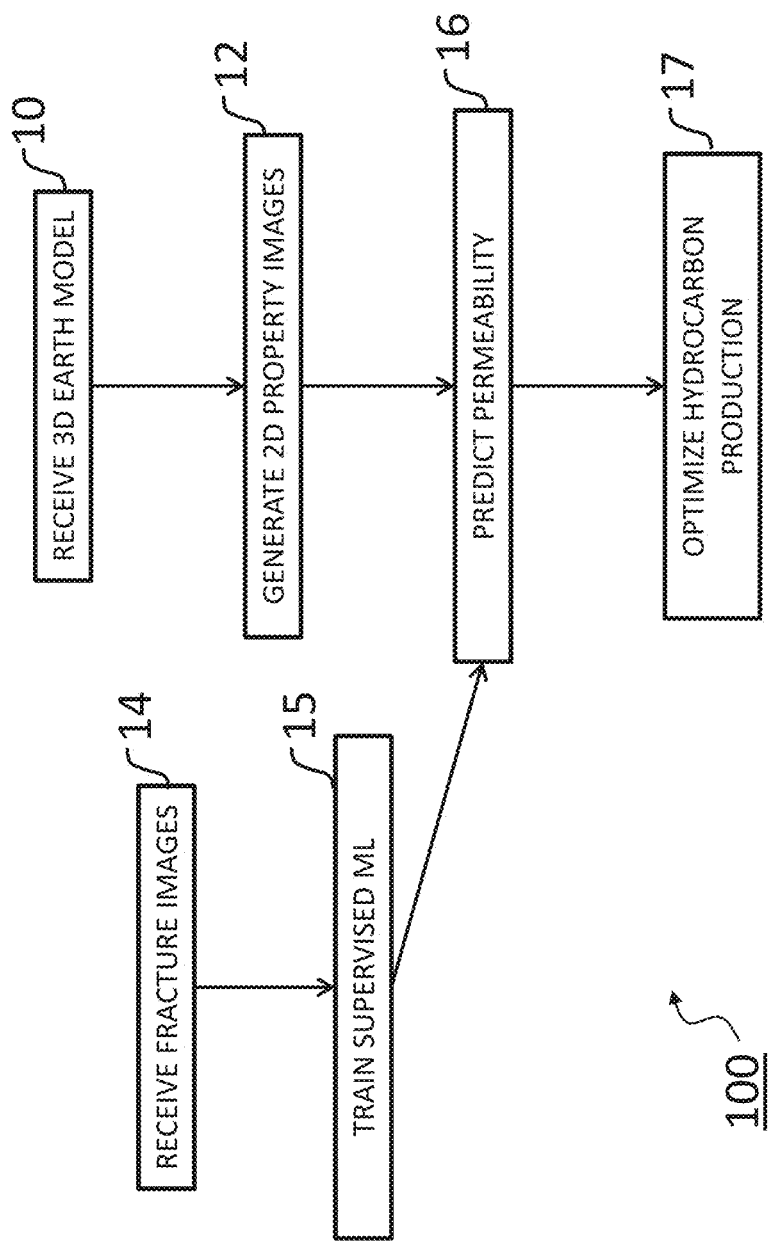
FIG. 2 illustrates a flowchart of a method of permeability prediction, in accordance with some embodiments.

FIG. 2 illustrates a flowchart of a method 100 for predicting permeability in low-porosity reservoirs. At operation 10, a 3-D earth model is received. Operation 12 generates 2-D property images from the 3-D earth model. These property images may include, by way of example and not limitation, porosity, saturation, Poisson's Ratio, and the like. These examples of property images are not meant to be limiting; any reservoir properties may be represented by these property images.

Method 100 of FIG. 2 also receives fracture images at operation 14. These may be existing or new simulated 2-D images in X-Z (spatial location-depth) space. At operation 15, the fracture images are used to train the physics-guided neural network (PGNN) for permeability prediction. This trained PGNN is then used at operation 16 to predict permeability for areas of interest in the 3D earth model. The predicted permeability is then used to optimize hydrocarbon production at operation 17.

Figure 3:
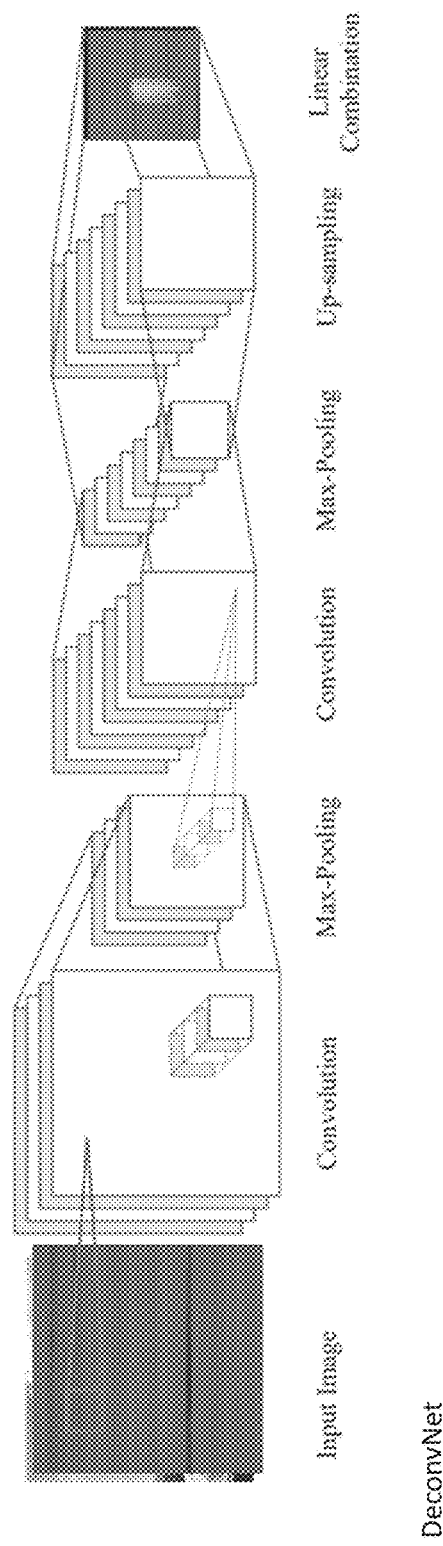
FIG. 3 explains two possible embodiments of the present invention.
Figure 3:
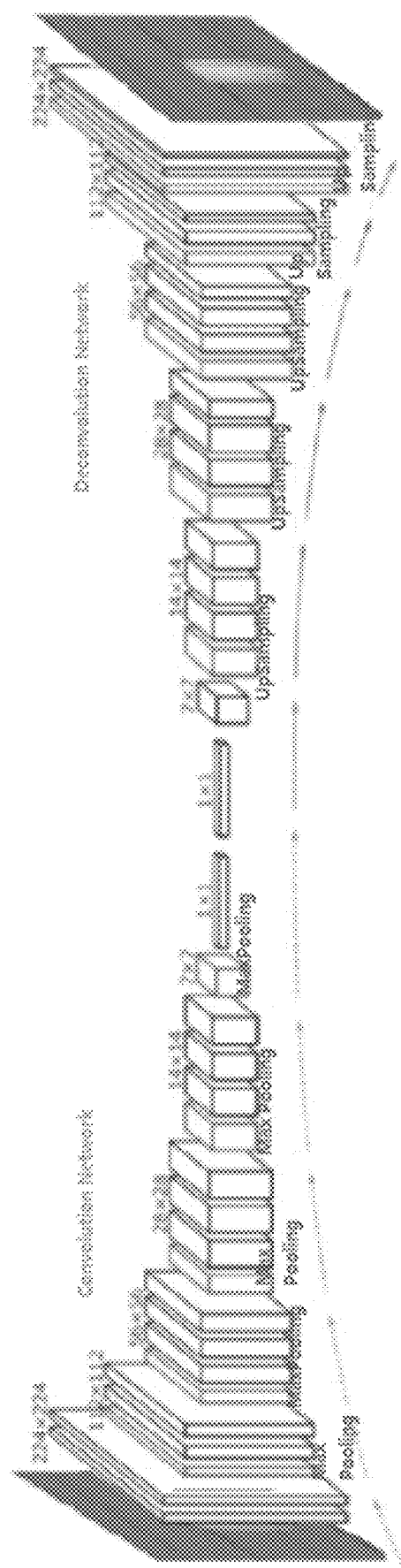

FIG. 3 illustrates two different neural networks within the scope of the present invention. The top illustration is a half CNN or LeNet without full connection. The input image undergoes convolution, max-pooling, convolution, max-pooling, up-sampling, and finally linear combination. The bottom illustration is a DeconvNet that may produce results with higher resolution in some embodiments. It includes a convolution network and a deconvolution network performing multiple steps of max-pooling and upsampling.

Figure 4:
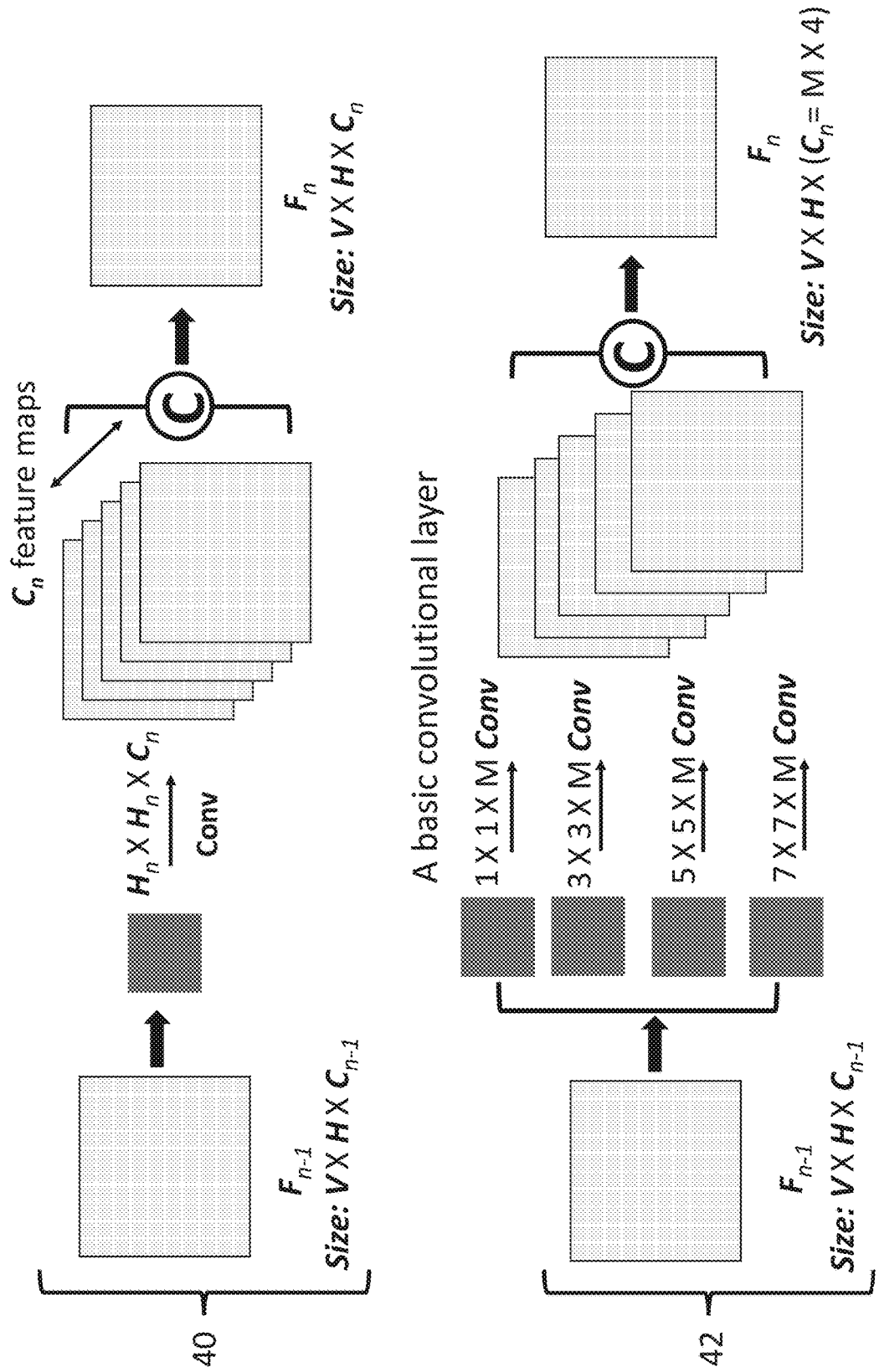
FIG. 4 demonstrates details of two possible embodiments of the present invention.

FIG. 4 illustrates details of two possible convolutional layers in the neural networks. The basic convolutional layer 40 performs well for images without features occurring at many scales. The convolutional layer for multi-scale feature 42 is advantageous for use when it is believed that the images contain features at multiple scales.

Figure 5:
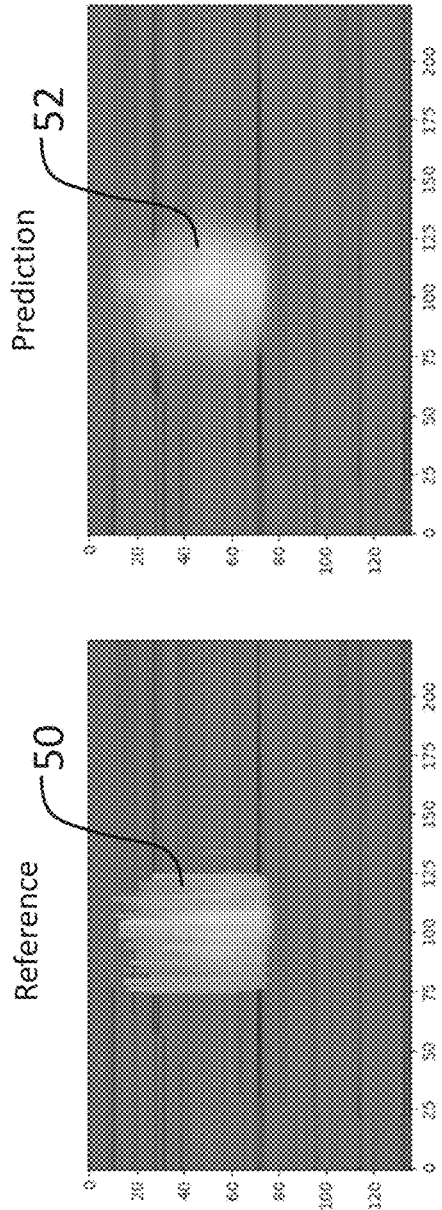
FIG. 5 illustrates a result of an embodiment of the present invention.
Figure 6:
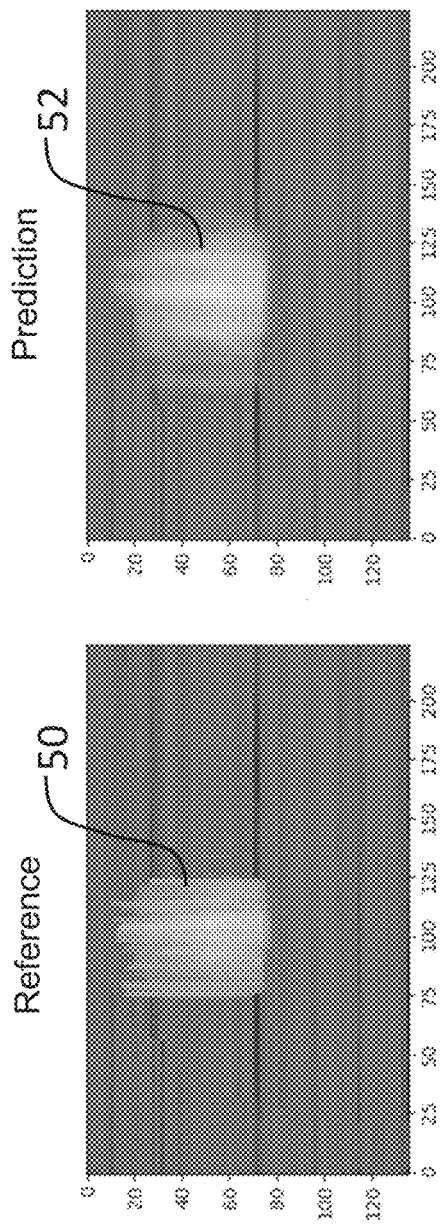
FIG. 6 illustrates a result of another embodiment of the present invention.
Figure 7:
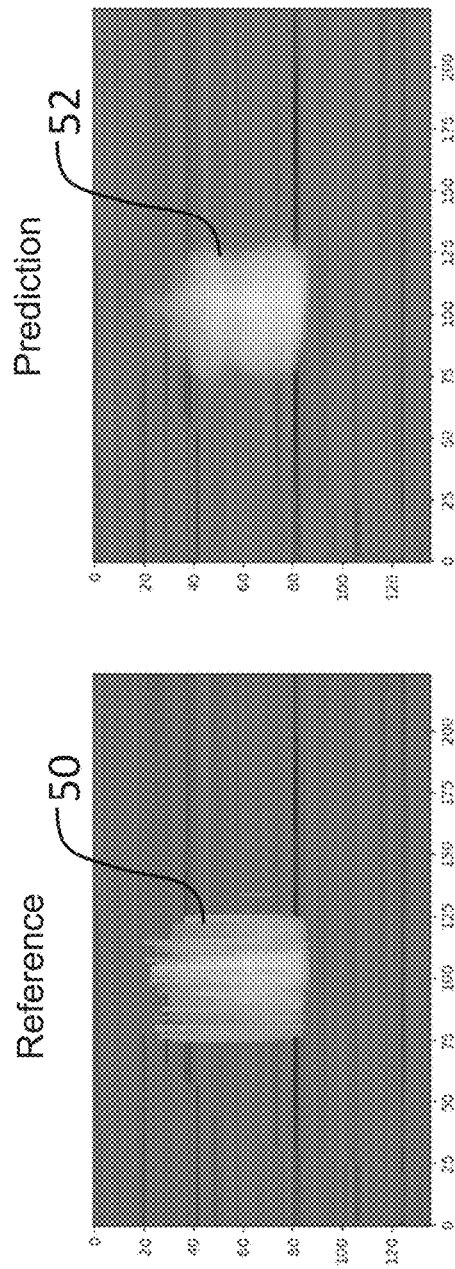
FIG. 7 illustrates a result of an embodiment of the present invention.
Figure 8:
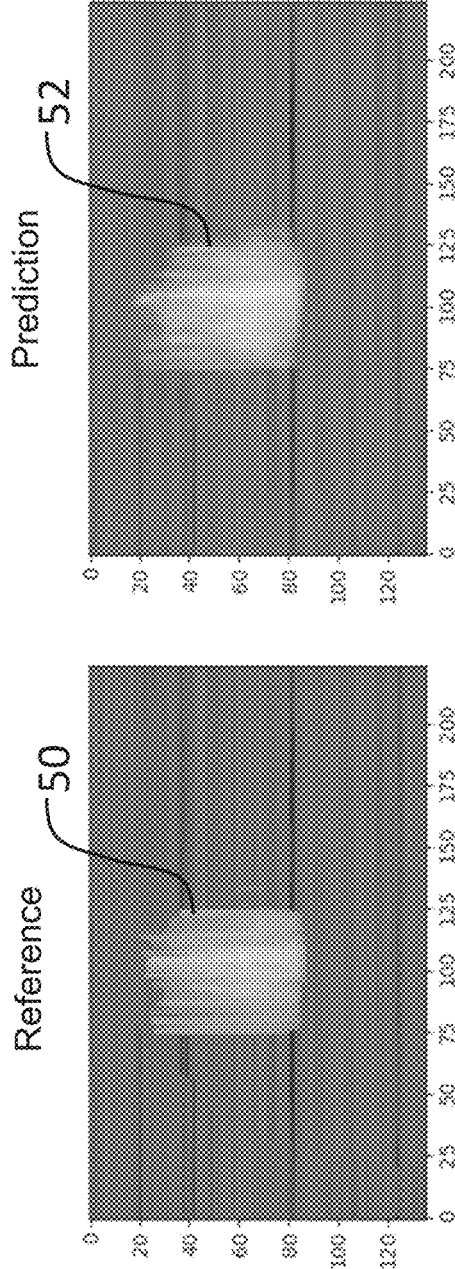
FIG. 8 illustrates a result of another embodiment of the present invention.

FIGS. 5, 6, 7, and 8 illustrate results of embodiments of the present invention with a reference (true) image and the predicted image generated by the present invention including the true fractures 50 and the predicted fractures 52. In FIG. 5, 23 cases were used for training a half CNN. In FIG. 6, 23 cases were used for training a DeconvNet. In FIG. 7, 46 cases were used for training a half CNN. In FIG. 8, 46 cases were used for training a DeconvNet.

Figure 9:
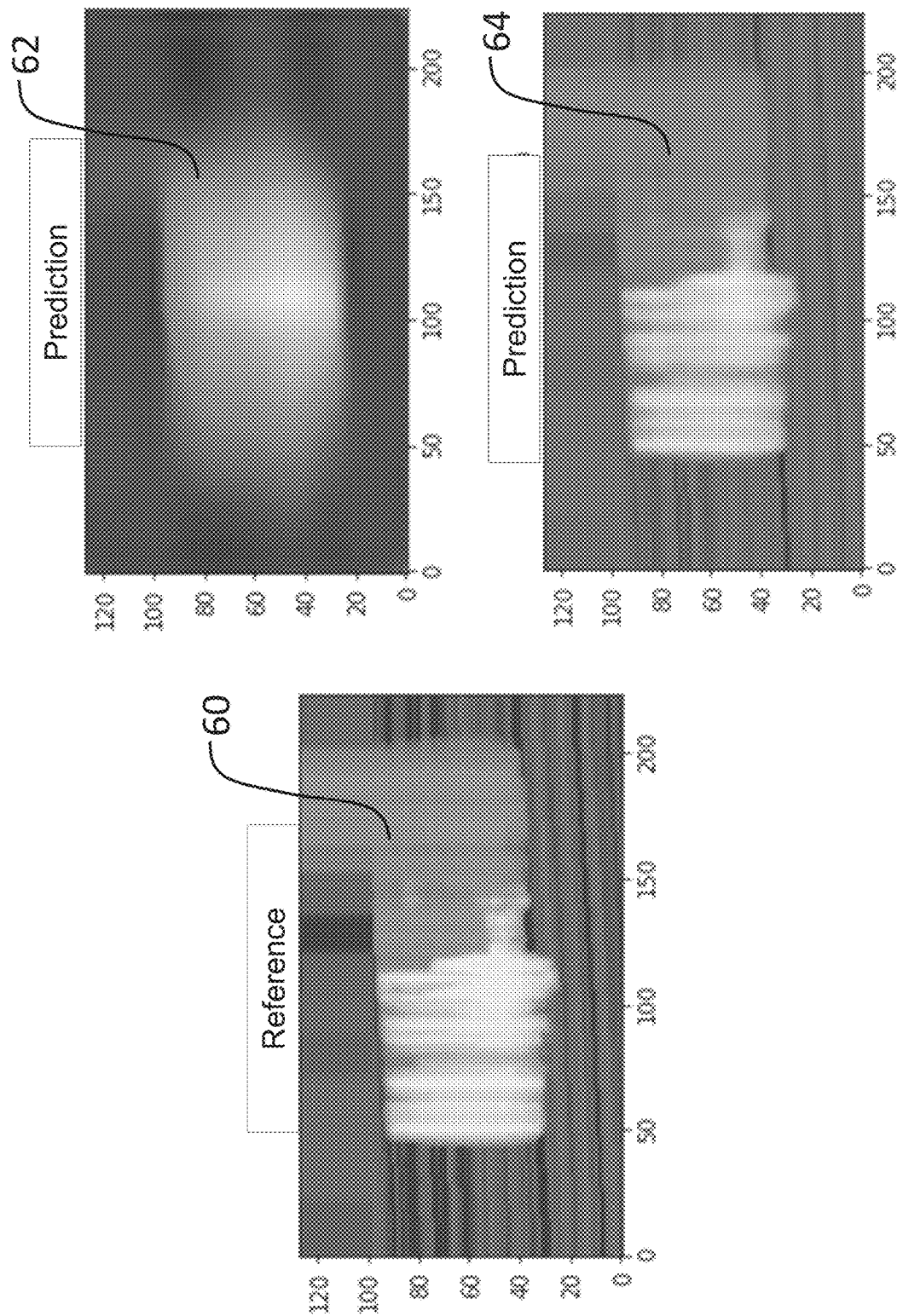
FIG. 9 illustrates a result of another embodiment of the present invention.
Figure 10:
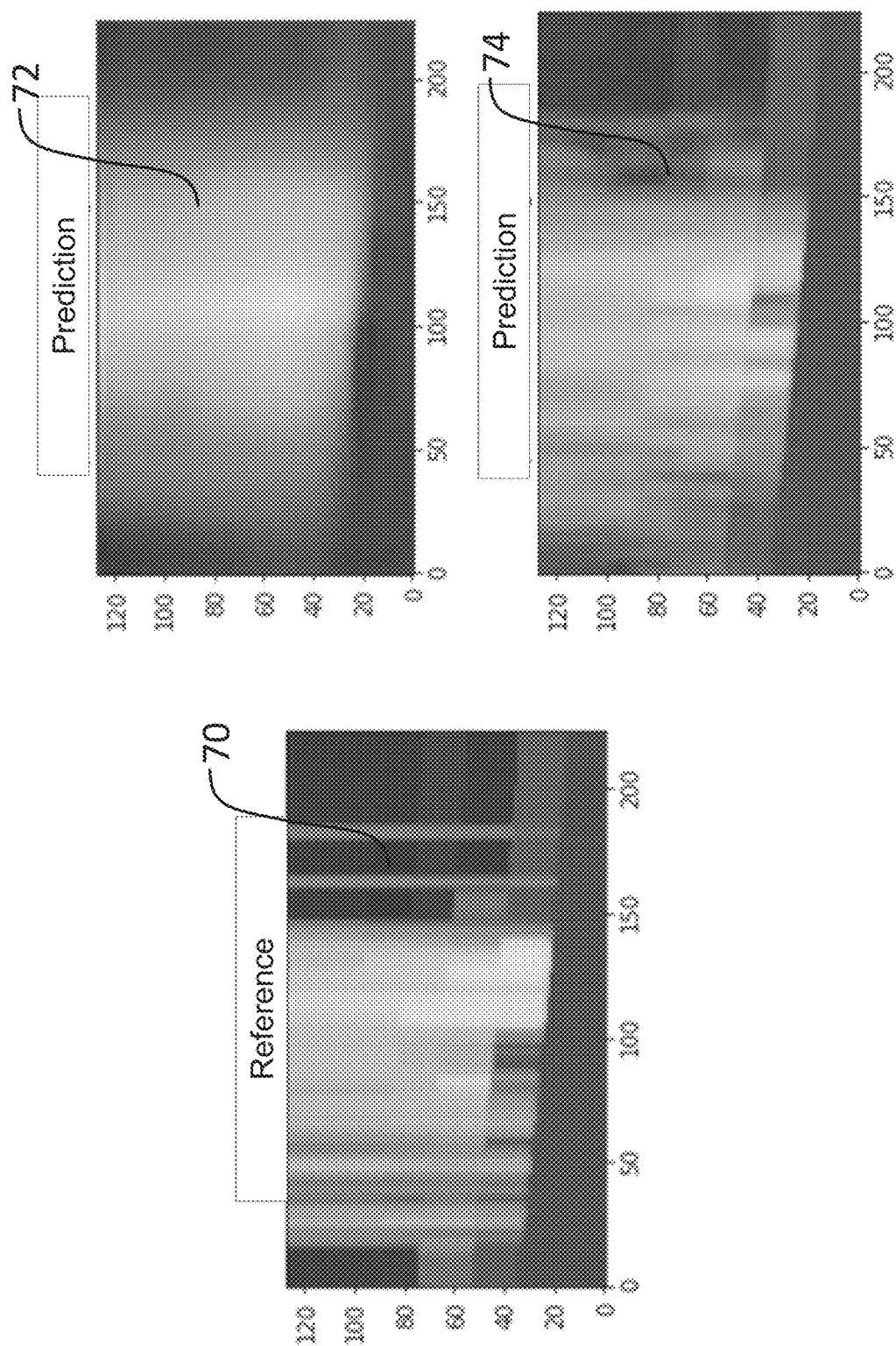
FIG. 10 illustrates a result of another embodiment of the present invention.

FIGS. 9 and 10 illustrate results of embodiments of the present invention with a reference (true) image and the predicted image generated by two different embodiments of the present invention. These figures compare the results of an embodiment using a basic convolutional layer 40 from FIG. 4 against the results using a convolutional layer for multi-scale feature 42 from FIG. 4. In FIG. 9, the reference model with reference fractures 60 is compared to the prediction resulting from using the basic convolutional layer 40 with single scale fractures 62 and the prediction resulting from the convolutional layer for multi-scale feature 42 with multi-scale fractures 64. As can be seen, the predicted multi-scale fractures 64 are much closer to the reference fractures 60 than the predicted single scale fractures 62. FIG. 9 shows the results of applying the neural network to the training dataset, so the predicted multi-scale fractures 64 are very accurate.

In FIG. 10, the reference model with reference fractures 70 is compared to the prediction resulting from using the basic convolutional layer 40 with single scale fractures 72 and the prediction resulting from the convolutional layer for multi-scale feature 42 with multi-scale fractures 74. As can be seen, the predicted multi-scale fractures 74 are much closer to the reference fractures 70 than the predicted single scale fractures 72. FIG. 10 shows the results of applying the neural network to a dataset different from the training dataset, so the predicted multi-scale fractures 74 are not as accurate as those seen in FIG. 9.

Figure 11:
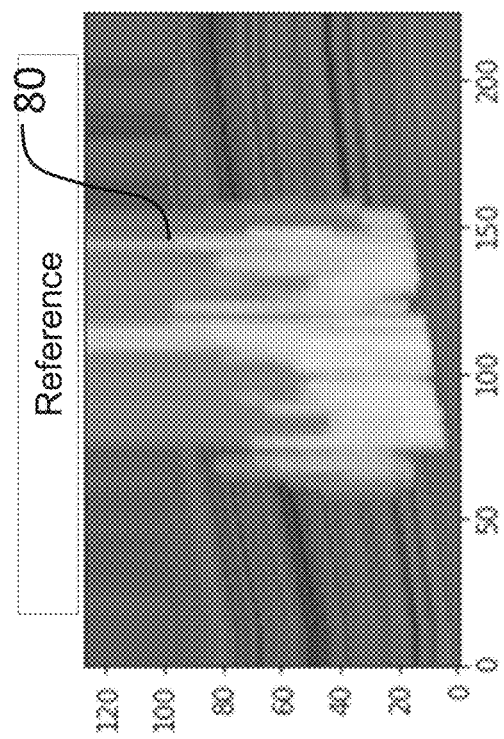
FIG. 11 illustrates a result of another embodiment of the present invention.
Figure 12:
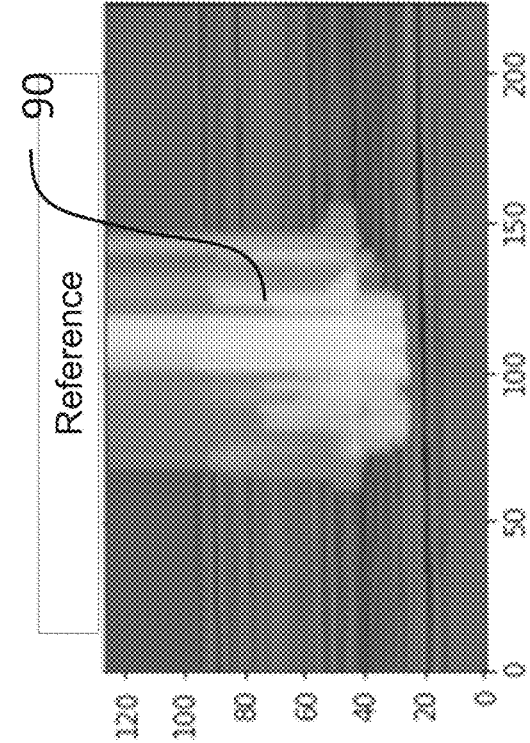
FIG. 12 illustrates a result of another embodiment of the present invention.

FIGS. 11 and 12 illustrate results of an embodiment of the present invention with a reference (true) image and the predicted image using a convolutional layer for multi-scale feature 42 from FIG. 4. In FIG. 11, the reference model with fractures 80 compares well with the predicted fractures 82. Similarly, in FIG. 12, the reference model with fractures 90 compares well with the predicted fractures 92. In both FIG. 11 and FIG. 12, the neural networks were trained on data other than that used for the predictions.

Figure 13:
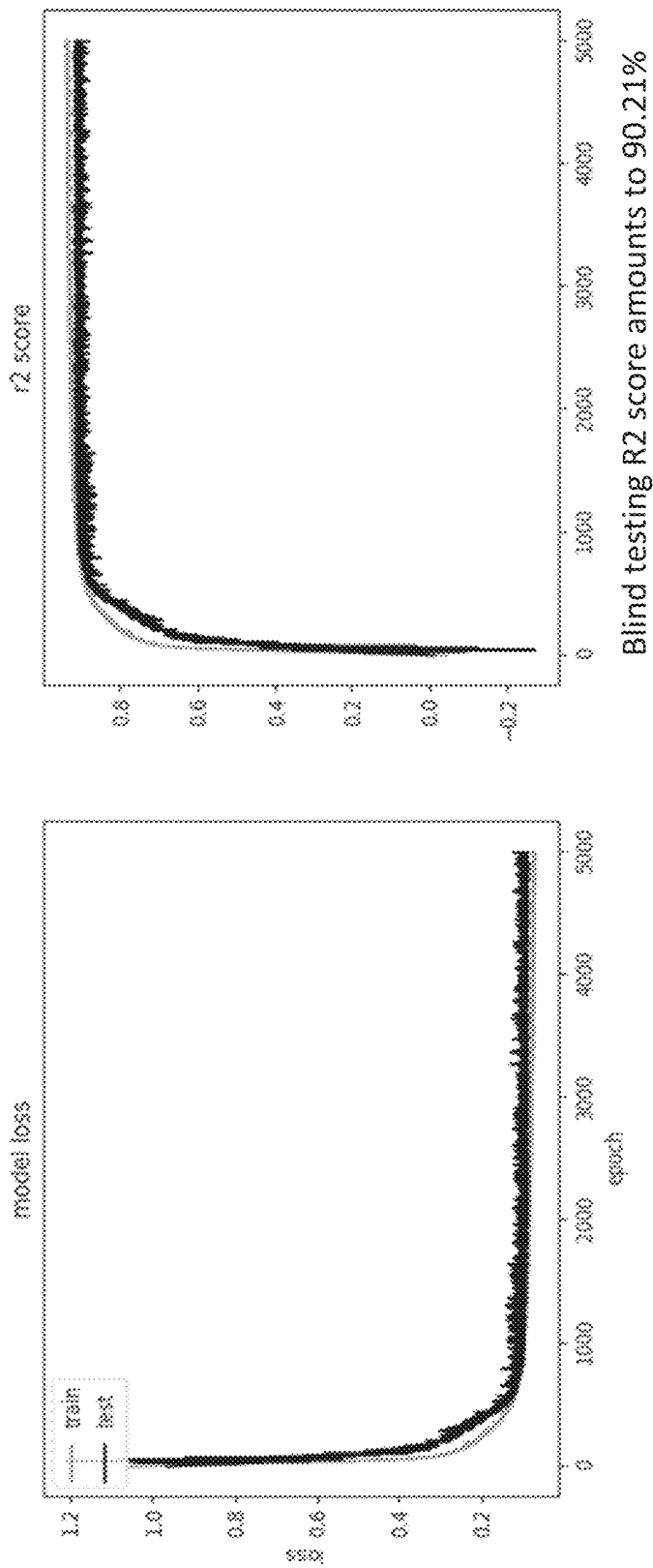
FIG. 13 illustrates a step of an embodiment of the present invention.

FIG. 13 demonstrates the efficiency and accuracy of the present invention. As can be seen, the optimization occurs very quickly and the accuracy is high even for blind testing.

Figure 14:
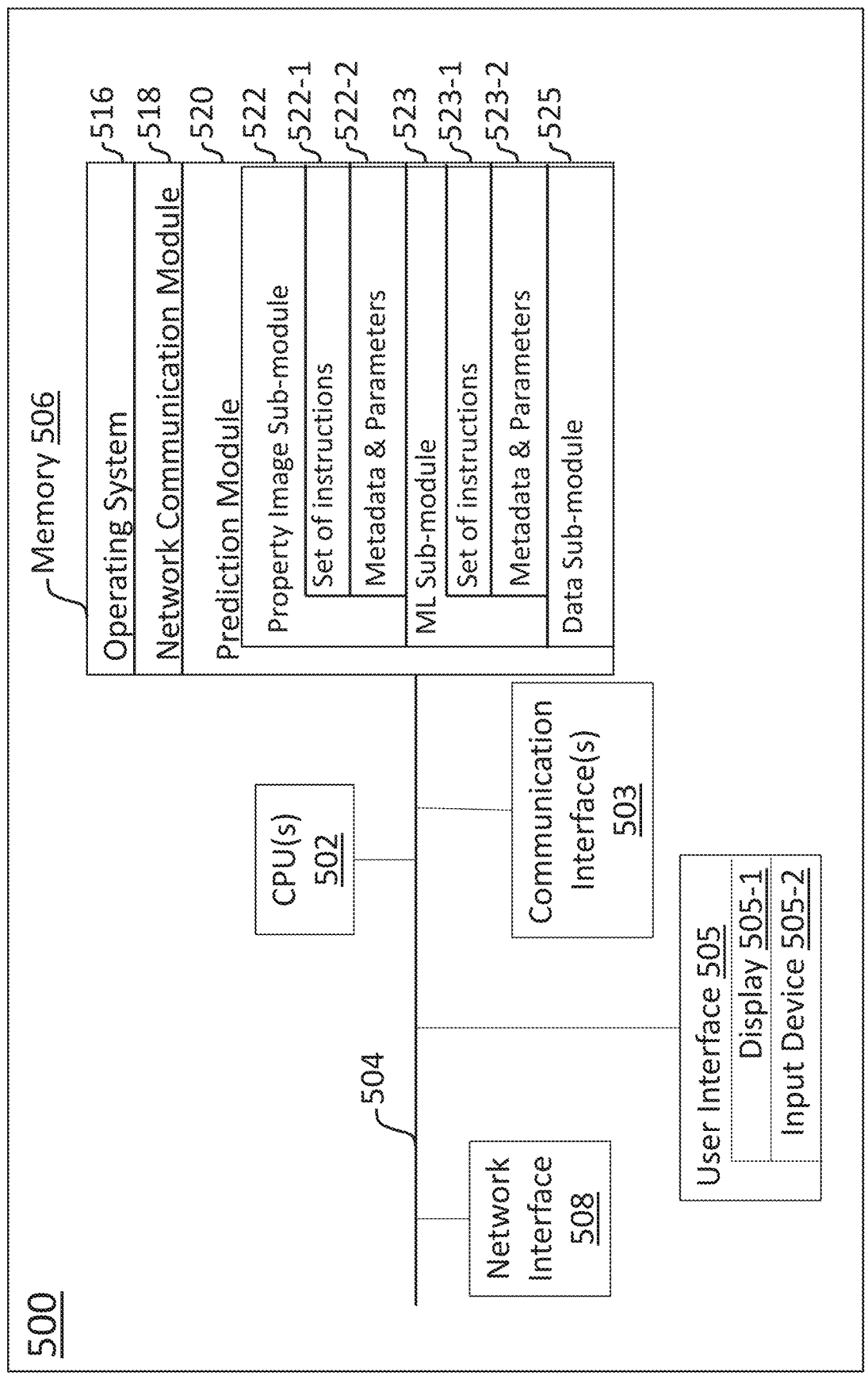
FIG. 14 is a block diagram illustrating a permeability prediction system, in accordance with some embodiments.

FIG. 14 is a block diagram illustrating a permeability prediction system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the permeability prediction system 500 includes one or more processing units (CPUs) 502, one or more network interfaces 508 and/or other communications interfaces 503, memory 506, and one or more communication buses 504 for interconnecting these and various other components. The permeability prediction system 500 may consist of devices on-premise or in the cloud. The permeability prediction system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store earth models, fracture images, and the like.

In some embodiments, memory 506 or the non-transitory computer readable storage medium of memory 506 stores the following programs, modules and data structures, or a subset thereof including an operating system 516, a network communication module 518, and a prediction module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the prediction module 520 executes the operations of method 100. Prediction module 520 may include data sub-module 525, which handles the input data and intermediate data products. This data is supplied by data sub-module 525 to other sub-modules.

Property Image sub-module 522 contains a set of instructions 522-1 and accepts metadata and parameters 522-2 that will enable it to execute operation 12 of method 100. The machine-learning (ML) function sub-module 523 contains a set of instructions 523-1 and accepts metadata and parameters 523-2 that will enable it to contribute to operations 15 and 16 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing the data and generating the predicted permeability. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 14) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of permeability prediction, comprising:
   a. receiving, at a computer processor, a 3-D earth model including a volume of interest;
   b. generating, via the computer processor, 2-D property images;
   c. receiving, at the computer processor, 2-D fracture images;
   d. training a physics-guided neural network (PGNN) using the 2-D fracture images;
   e. providing the 2-D property images to the PGNN as input; and
   f. predicting, by the PGNN, permeability corresponding to the 2-D property images;
   and wherein the PGNN is a multi-channel whole-image deep neural network including convolutional and deconvolutional layers with considerations of skip connectors to avoid vanishing gradient issues.

2. The method of claim 1 wherein the 2-D property images include one or more of porosity, water saturation, Poisson's Ratio, reservoir pressure, and clay content.

3. The method of claim 1 wherein the PGNN includes a convolutional layer for multi-scale feature.

4. The method of claim 1 wherein the PGNN is trained with consideration of structure constraints.

5. The method of claim 1 further comprising displaying the permeability on a graphical user interface.

6. A computer system comprising:
   one or more processors;
   memory; and
   one or more programs, wherein the one or more programs are stored in the memory and configured to be executed by the one or more processors, the one or more programs including instructions that when executed by the one or more processors cause the system to execute:

a. receiving, at the one or more processors, a 3-D earth model including a volume of interest;
b. generating, via the one or more processors, 2-D property images;
c. receiving, at the one or more processors, 2-D fracture images;
d. training a physics-guided neural network (PGNN) using the 2-D fracture images;
e. providing the 2-D property images to the PGNN as input; and
f. predicting, by the PGNN, permeability corresponding to the 2-D images;

and wherein the PGNN is a multi-channel whole-images deep neural network including convolutional and deconvolutional layers with considerations of skip connections to avoid vanishing gradient issues.

7. A non-transitory computer readable storage medium storing one or more programs, the one or more programs comprising instructions, which when executed by an electronic device with one or more processors and memory, cause the device to execute a. receiving, at the one or more processors, a 3-D earth model including a volume of interest;
b. generating, via the one or more processors, 2-D property images;
c. receiving, at the one or more processors, 2-D fracture images;
d. training a physics-guided neural network (PGNN) using the 2-D fracture images;
e. providing the 2-D property images to the PGNN as input; and
f. predicting, by the PGNN, permeability corresponding to the 2-D property images;

and wherein the PGNN is a multi-channel whole-image deep neural network including convolutional and deconvolutional layers with considerations of skip connections to avoid vanishing gradient issues.

* * * * *